US008612583B2

(12) United States Patent
Hui et al.

(10) Patent No.: US 8,612,583 B2
(45) Date of Patent: Dec. 17, 2013

(54) NETWORK MANAGEMENT SYSTEM SCHEDULING FOR LOW POWER AND LOSSY NETWORKS

(75) Inventors: Jonathan W. Hui, Foster City, CA (US); Gilman Tolle, San Francisco, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 317 days.

(21) Appl. No.: 13/194,186

(22) Filed: Jul. 29, 2011

(65) Prior Publication Data

US 2013/0031253 A1  Jan. 31, 2013

(51) Int. Cl.
*G06F 15/173* (2006.01)

(52) U.S. Cl.
USPC ........... 709/224; 709/203; 709/220; 709/225; 709/226

(58) Field of Classification Search
USPC .................. 709/203, 217, 220, 224, 225, 226
See application file for complete search history.

(56) References Cited

U.S. PATENT DOCUMENTS

| 7,633,854 | B2 | 12/2009 | Saleh et al. | |
|---|---|---|---|---|
| 7,668,953 | B1 | 2/2010 | Sinclair et al. | |
| 7,707,240 | B2 | 4/2010 | Marascio et al. | |
| 7,921,686 | B2 | 4/2011 | Bagepalli et al. | |
| 7,945,651 | B2 | 5/2011 | Sankaran | |
| 7,962,582 | B2 | 6/2011 | Potti et al. | |
| 8,078,727 | B2 * | 12/2011 | Hanson et al. | 709/226 |
| 2006/0123079 | A1 * | 6/2006 | Sturniolo et al. | 709/203 |
| 2012/0179819 | A1 * | 7/2012 | Hanson et al. | 709/225 |
| 2013/0097448 | A1 * | 4/2013 | Davis et al. | 713/323 |

OTHER PUBLICATIONS

"RPL: IPv6 Routing Protocol for Low Power and Lossy Networks" <draft-ietf-roll-rpl-19> by Winter, at al. (Mar. 13, 2011 version).
"Constrained Application Protocol (CoAP)" <draft-ietf-core-coap-07>, by Shelby et al. (Jul. 8, 2011 edition).

* cited by examiner

*Primary Examiner* — Phuoc Nguyen
(74) *Attorney, Agent, or Firm* — Edwards Wildman Palmer LLP; James M. Behmke; Jonathon P. Western (57) ABSTRACT

In one embodiment, a network management system (NMS) determines an intent to initialize a request-response exchange with a plurality of clients in a low power and lossy network (LLN). In response, the NMS adaptively schedules corresponding responses from the clients to distribute the responses across a period of time based on a network state of the LLN. Accordingly, requests may be generated by the NMS with an indication of a corresponding schedule to be used by the clients to respond, and transmitted into the LLN to solicit the responses, which are then received at the NMS according to the indicated schedule.

24 Claims, 11 Drawing Sheets

NETWORK MANAGEMENT SYSTEM SCHEDULING FOR LOW POWER AND LOSSY NETWORKS

TECHNICAL FIELD

The present disclosure relates generally to computer networks, and, more particularly, to network management systems (NMSs) and scheduling of an NMS request-response exchange.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. A primary challenge is to make effective use of the limited and dynamic network capacity. While one dominant application for LLNs, initially, is to support Automated Meter Reading (AMR), such networks may also be used to support multiple applications simultaneously, such as distributed sensing, actuation, etc. Accordingly, the LLNs must sometimes be configured to provide a multi-service network infrastructure. Other example applications include Distribution Automation (DA), plug-is in electric vehicles, etc. Such applications typically involve different traffic characteristics and requirements (e.g., point-to-point vs. multipoint-to-point, different latency bounds, etc.).

While a Network Management System (NMS) that is responsible for the LLN is primarily a control-plane function, management of the network itself can be considered to utilize a number of different applications simultaneously. By contrast with a "classic" IP network, such functions can consume a very significant portion of the constrained resources of an LLN. Some example functions include firmware updates, security updates, configuration changes, on-demand control and query, etc. Most of these functions involve interactions where the NMS sends out a single request, nodes process the request, and generate a response.

In large-scale LLNs, if nodes naively respond to a request, the response traffic can easily overwhelm the network, in what is called a "response-implosion" problem. That is, the generation of such a large amount of traffic in LLNs is particularly problematic, with generally very limited network/node resources and the large number of nodes in the typical LLN deployment. Existing and widely deployed approaches to Quality of Service (QoS) and Call Admission Control (CAC) typically used in "classic" IP networks, however, are ill-suited for LLNs. Heavy signaling can easily overwhelm the limited network capacity, while strict resource reservation mechanisms cannot operate effectively when there are not enough resources to allocate (limited memory).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a network management system (NMS) determines an intent to initialize a request-response exchange with a plurality of clients in a low power and lossy network (LLN). In response, the NMS adaptively schedules corresponding responses from the clients to distribute the responses across a period of time based on a network state of the LLN. Accordingly, requests may be generated by the NMS with an indication of a corresponding schedule to be used by the clients to respond, and transmitted into the LLN to solicit the responses, which are then received at the NMS according to the indicated schedule.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on is resources such as energy, memory, computational speed and bandwidth.

Correspondingly, a reactive routing protocol may, though need not, be used in place of a proactive routing protocol for smart object networks.

Figure 1:
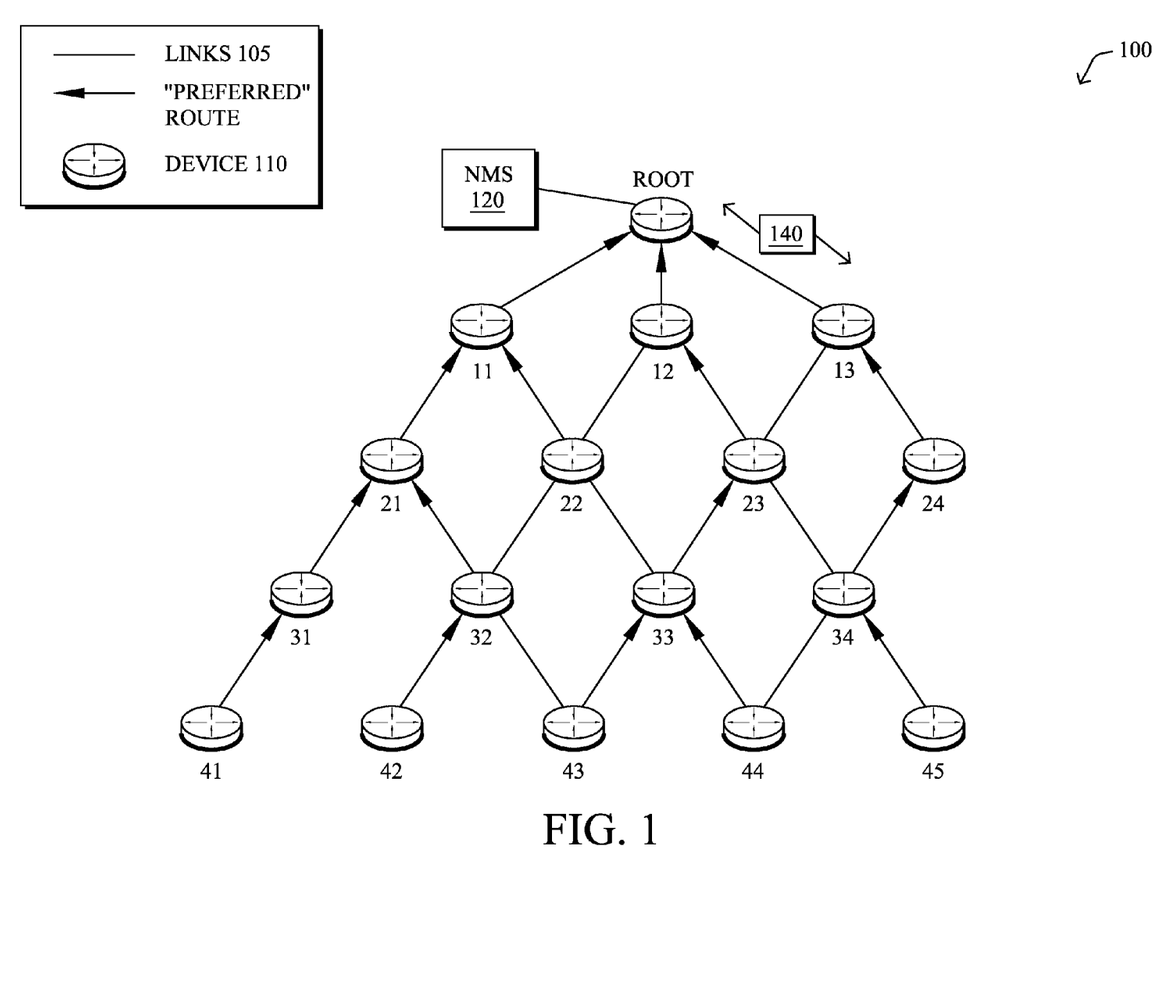
FIG. 1 illustrates an example computer network.

FIG. 1 is a schematic block diagram of an example computer network 100 illustratively comprising nodes/devices 110 (e.g., labeled as shown, "root," "11," "12," . . . "45", and described in FIG. 2 below) interconnected by various methods of communication. For instance, the links 105 may be wired links and/or shared media (e.g., wireless links, PLC links, etc.), where certain nodes 110, such as, e.g., routers, sensors, computers, etc., may be in communication with other nodes 110, e.g., based on distance, signal strength, current operational status, location, etc. In addition, a centralized controller/device, such as a network management service (NMS) device 120, may be in communication with the network 100, such as through the root node. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, and/or other shared-media protocols where appropriate. In this context, a protocol consists of a set of rules defining how the nodes interact with each other.

Figure 2:
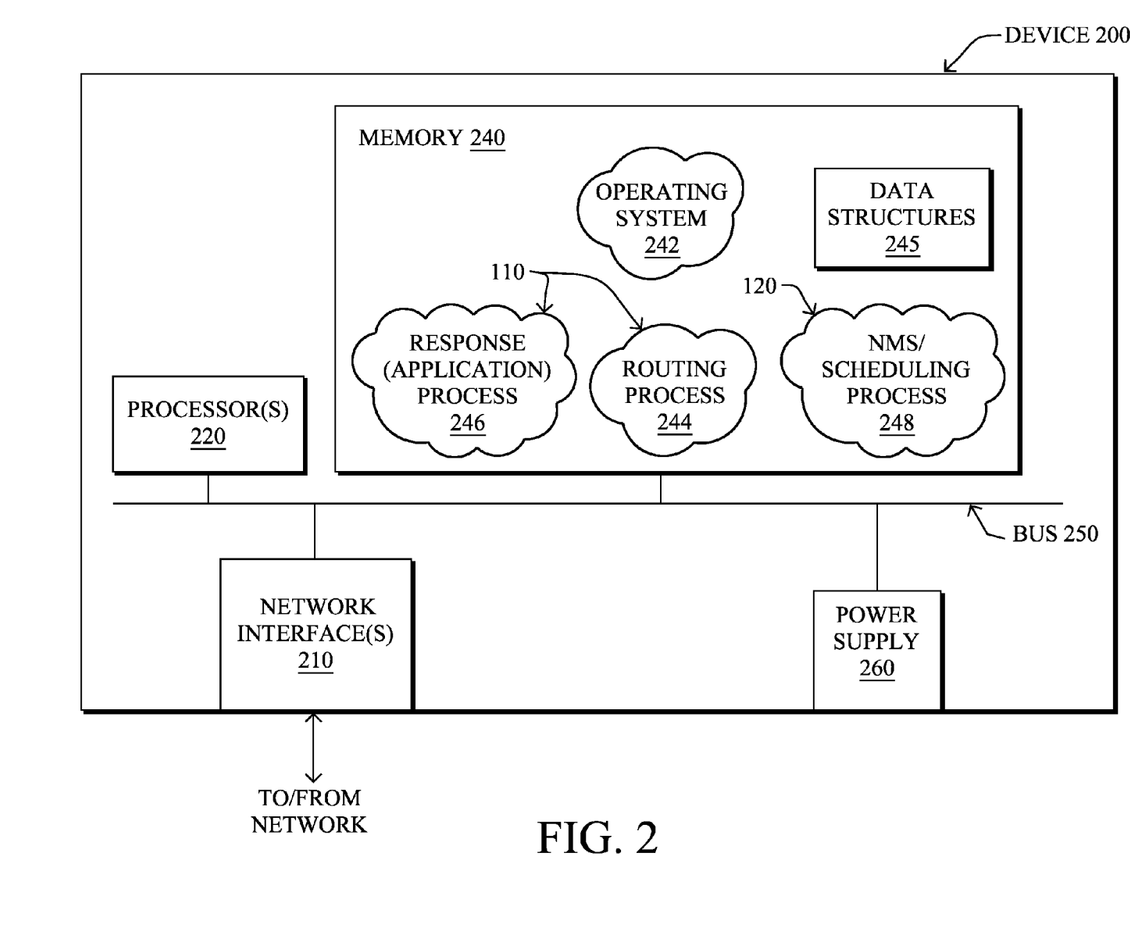
FIG. 2 illustrates an example network device/node.

FIG. 2 is a schematic block diagram of an example node/device 200 that may be used with one or more embodiments described herein, e.g., as any of the nodes 110 shown in FIG. 1 above, and particularly as NMS 120. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise, on devices 110, routing process/services 244 and an illustrative "response (application)" process 246, while on the NMS 120 these software processes and/or services may comprise an "NMS/scheduling" process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietfroll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

As an example, the network 100 depicted in FIG. 1 shows an LLN where paths have been computed using a routing protocol, where the arrows show preferred path/route. Note that while the arrows could be considered a DAG, no assumption is made herein on the nature of the underlying routing protocol.

As noted above, a primary challenge is to make effective use of the limited and dynamic network capacity. While one dominant application for LLNs, initially, is to support Automated Meter Reading (AMR), such networks may also be used to support multiple applications simultaneously, such as distributed sensing, actuation, etc. Accordingly, the LLNs must sometimes be configured to provide a multi-service network infrastructure. Other example applications include Distribution Automation (DA), plug-in electric vehicles, etc. Such applications typically involve different traffic characteristics and requirements (e.g., point-to-point vs. multipoint-to-point, different latency bounds, etc.).

While a Network Management System (NMS) that is responsible for the LLN is primarily a control-plane function, management of the network itself can be considered to utilize a number of different applications simultaneously. By contrast with a "classic" IP network, such functions can consume a very significant portion of the constrained resources of an LLN. Some example functions include:

1) Firmware update: A firmware image for LLN devices can be on the order of 512 kilobytes. With a packet size of 512 bytes each, on the order of 1000 packets must be delivered to those devices receiving the firmware image. Customers repeatedly cite firmware update and the network resources it consumes as an area of concern.

2) Security updates: LLNs may utilize cryptographic security at different layers. The link-layer, for example, utilizes a PAN-wide group key. But to refresh the group key (GTK), the Authenticator must perform a 2-way handshake with each Supplicant individually. Customers require a FAR to handle up to 5000 devices and a simple group key refresh requires at least 10,000 messages. Refreshing the PTK or PMK require even more overhead as the involve handshakes with more messages.

3) Configuration changes: An operator may modify persistent configuration parameters on a large number of nodes spread across many PANs. Pushing a new configuration usually requires sending a multicast message to a collection of groups, each of which representing a PAN that may have up to 5000 devices. The NMS must then collect confirmation messages from the group members, and retransmit the message to a subset of the group in order to reliably deliver the configuration change.

4) On-demand control and query: An operator may send commands and initiate on-demand queries to a large number of nodes while attempting to troubleshoot a network. Such queries usually involve sending a multicast message to a dynamically-defined group that has a large number of nodes subscribed (e.g., an entire PAN that may contain up to 5000 devices) and receiving a response message for each individual device.

Most of these functions involve interactions where the NMS sends out a single request, nodes process the request, and generate a response. In large-scale LLNs, if nodes naively respond to a request, the response traffic can easily overwhelm the network, in what is called a "response-implosion" problem. That is, the generation of such a large amount of traffic in LLNs is particularly problematic, with generally very limited network/node resources and the large number of nodes in the typical LLN deployment. Existing and widely deployed approaches to Quality of Service (QoS) and Call Admission Control (CAC) typically used in "classic" IP networks, however, are ill-suited for LLNs. Heavy signaling can easily overwhelm the limited network capacity, while strict resource reservation mechanisms cannot operate effectively when there are not enough resources to allocate (limited memory).

Note that other existing solutions involve having a network operator manually specify an acceptable delay bound in initiating a request, as in, how long an NMS is allowed to wait before transmitting a request. While this method is simple, it requires human interaction and relies on the operator's knowledge of the network. In particular, application schedulers today plan to push or collect data from the network regardless of the network state, leaving the network administrator in charge of enabling various networking mechanisms so as to keep guaranteeing SLAs (service level agreements). For example, when pushing a new firmware image to devices in the LLN, the application scheduler requires the administrator to explicitly specify delay parameters that indicate how long to wait between sending individual blocks of the image over multicast, and how long to wait while collecting confirmation responses. Then, the network administrator must choose a time of day at which to start the firmware update, and a window in which to run it. If the administrator sets those delay parameters to excessively short durations, or chooses a time of day at which other applications are already using the network heavily, the firmware update process may cause network congestion, cause message loss, and violate SLAs for the other applications sharing the network. This same process of explicitly setting delay parameters and start times must also be performed before pushing new configurations, and before sending on-demand commands to groups of devices.

NMS Scheduling

The techniques herein are generally directed to an approach that intelligently and adaptively controls and schedules NMS request-response exchange traffic, particularly to avoid the response-implosion problem. As described herein, this may illustratively be achieved by including application-independent parameters in a request packet to control a client's response (e.g., a time window, random distribution, response filters, etc.), where the request-response transaction is intelligently scheduled based on the network state, application requirements, and overall network utilization bounds.

Specifically, according to one or more embodiments of the disclosure as described in detail below, a network management system (NMS) 120 determines an intent to initialize a request-response exchange with a plurality of clients 110 in a low power and lossy network (LLN) 100. In response, the NMS adaptively schedules corresponding responses from the clients to distribute the responses across a period of time based on a network state of the LLN. Accordingly, requests may be generated by the NMS with an indication of a corresponding schedule to be used by the clients to respond, and transmitted into the LLN to solicit the responses, which are then received at the NMS according to the indicated schedule.

Illustratively, the techniques described herein may be performed by hardware, software, and/or firmware, such as in accordance with the NMS/scheduling process 248 on the NMS 120 and the response (application) process 246 on devices 110, each of which may contain computer executable instructions executed by the processor 220 to perform functions relating to the novel techniques described herein, e.g., in conjunction with each other. For example, the techniques herein may be treated as extensions to conventional protocols, such as various operations, administration, and management/maintenance (OAM) protocols, or other applications, and as such, may be processed by similar components understood in the art that execute those protocols and/or applications, accordingly.

Figure 3:
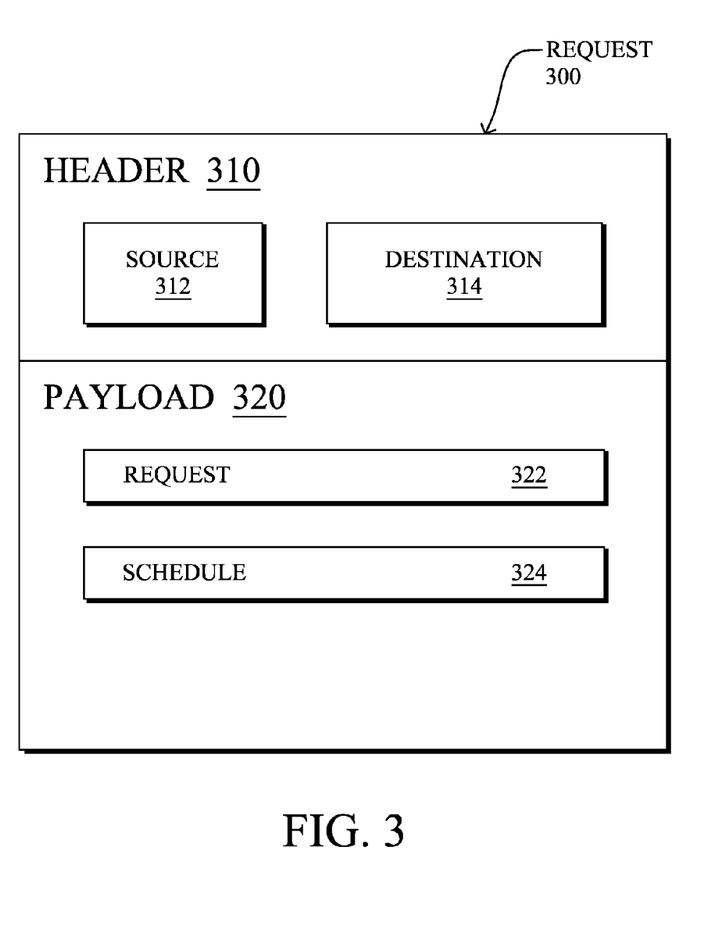
FIG. 3 illustrates an example request message.

Operationally, an NMS 120 determines an intent to initialize a request-response exchange with a plurality of clients 110 in an LLN, and in response, adaptively schedules the corresponding responses from the clients in order to distribute the responses across a period of time based on a network state of the LLN, as described below. Illustratively, FIG. 3 shows an example request 300 that may be generated by the NMS to carry an indication of a corresponding schedule to be used by the clients to respond, accordingly. For instance, the request 300 may generally comprise one or more headers 310 used to forward the packet, e.g., with a source address 312 (e.g., of the NMS) and a destination address 314 (e.g., of each individual client in unicast requests, or else a shared broadcast or multicast address, accordingly). The payload 320 of the packet may be populated with the request 322 itself, e.g., instructions on what response is being solicited, a firmware upgrade "request" (e.g., where responses to the request may be acknowledgment of the upgrade), etc.

In addition, the payload 320 (or, notably in certain alternative embodiments, a field within a particular header 310) may comprise a schedule field 324, which is used to indicate the adaptively determined schedule to be used by the clients when responding. That is, the techniques herein rely on placing application-independent parameters that drive the generation of responses directly in the request message 300. Note that the response parameters (schedule 324), for example, may be included as an IPv6 Destination Option, a "CoAP" Option (e.g., defined in the IETF Internet Draft entitled "Constrained Application Protocol (CoAP)"<draft-ietf-core-coap-07>, by Shelby et al. (Jul. 8, 2011 edition)), application-specific payloads, etc.

Illustratively, the schedule field 324 of the request message 300 may specify a determined time window within which the clients 110 pick a random time to send their response. Alternatively, or in addition, the request message may indicate a particular random distribution model to utilize. For example, uniform distribution is the simplest and ensures that nodes uniformly spread their response across the time window. However, the request message may also specify a geometric distribution model, for example, to reduce the number of responses in the beginning of the window and increase them towards the end of the window. Geometric distributions are useful in situations where the NMS wants to receive a few responses quickly while minimizing the likelihood of congestion caused by early responses.

In another embodiment, as an addition or alternative, schedule field 324 may comprise one or more application-independent filters that serve to suppress responses from one or more correspondingly filtered clients. For example, the filters may define an address list or a bit-mask to be applied to the device addresses, or else may specify various node properties, link properties, or other features of the nodes that may be used to reduce the set of responding clients, accordingly. In one embodiment, the filter strictly limits responses to a set of clients 110, while in another embodiment, the filter is used in a first request 300, and then additional requests 300 may comprise a reverse filter (i.e., filtering out the nodes not previously filtered) in order to "poll" (or upgrade, etc.) different sets of client devices at different times according to the adaptive scheduling described herein.

By including dynamic response parameters in the request message itself, the NMS thus has fine-grained control over a variety of application traffic that is initiated by the NMS or the nodes themselves. Using the network-state information that the NMS collects, the NMS can then intelligently schedule requests and their responses to help ensure that the network maintains a certain level of performance.

In particular, in accordance with one or more embodiments herein, the NMS determines of the network state, e.g., using long-term network state information continuously reported at a low rate of data acquisition. The NMS may then trigger on-demand network statistics to obtain up-to-date network statistics (as opposed to averaged values of resource availability over longer periods of time), e.g., for a short-term at an increased rate of data acquisition and would schedule applications (request-response exchanges) according to the network state, application traffic characteristics and resources that can be left available for user data after confirming the resource availability.

In other words, one of the main inputs that control the application scheduler is the network state itself. Before initiating application functions that utilize a significant amount of network resources (e.g., firmware upgrade, security key refresh, configuration changes, or on-demand queries for troubleshooting a network), the NMS makes a rough determination of the current network state. This rough determination would be based on the low data-rate management traffic that the devices continually report to the NMS.

If the NMS determines that the network is likely capable of handling the additional traffic load, the NMS may then query the network to make a better determination of the network state. In doing so, the NMS enters a short live-monitoring phase that consists of sending a probe to all nodes in the network so that they can enter a monitoring state. Such a probe could be sent using the RPL routing protocol with a newly defined TLV carried in the DIO messages (reset of the trickle timer) or alternatively using an IPv6 ICMP packet to all IPv6 nodes in the network that would indicate the set of network characteristics of interest (link utilization, CPU processing, memory usage, etc.) according to the nature of the flows to be sent and the period of time T during which the network statistics should be computed by the nodes.

Upon receiving such a probe, each node would then start monitoring a set of network characteristics. Note that by contrast with the current approach whereby nodes do send aggregated network statistics to the NMS at a low rate, such network statistics would reflect the network state computed over a short period of time. For example, upon receiving the probe request, each node would start monitoring the link utilization and CPU processing over a short (e.g., 5 min) interval. After the expiration of T+x ms, each node in the network would send its network statistics to the NMS along the routing topologies (illustratively, x may be inversely proportional to the node rank in routing topologies so as to maximize the probability to aggregate). Note also that these statistics may in the form of maximum so as to reduce the amount of gathered data.

In one embodiment, for example, with an understanding of the network statistics and routing behavior (e.g., simulating the routing paths from the client nodes to the NMS), the NMS can estimate the load each request-response interaction generates within the network. In particular, in accordance with the techniques herein, the network state may be determined by monitoring resource availability in the LLN, and adaptively scheduling corresponding responses is based on preventing surpassing resource availability in the LLN. For instance, the NMS may be configured with policies that specify throughput requirements, latency, etc. to indicate what network resources it can utilize, thus adaptively scheduling corresponding responses is based on one or more resource utilization bounds within the network.

Additionally, applications generating the request-response traffic may make "hints" as to their scheduling preferences, such that adaptively scheduling corresponding responses is based on one or more specified parameters from the application (i.e., the one responsible for the request-response exchange). For instance, applications may impose their own policies, such as a requested delay bound, time-delay requirement between subsequent packets, response distribution, response filters, etc.). Note also that in addition to the general network state, as well as the "hints" from the application causing the request-response exchange, adaptively scheduling the corresponding responses may also be based on one or more other request-response exchanges operating in the LLN, such as by the particular NMS 120 or by other NMSs and/or other applications.

Using the network state, application traffic characteristics, application "hints," overall requirements, resources that can be left available for user data the NMS then intelligently schedules the request-response traffic accordingly (and without manual intervention). That is, for each request-response, the NMS estimates the load and schedules them accordingly. Note that the load may be different for different parts of the network and the NMS can and should consider those differences. The NMS can optionally change the response time window to make a tradeoff between the completion time of a request-response transaction versus average network utilization during the request-response transaction.

Figure 4:
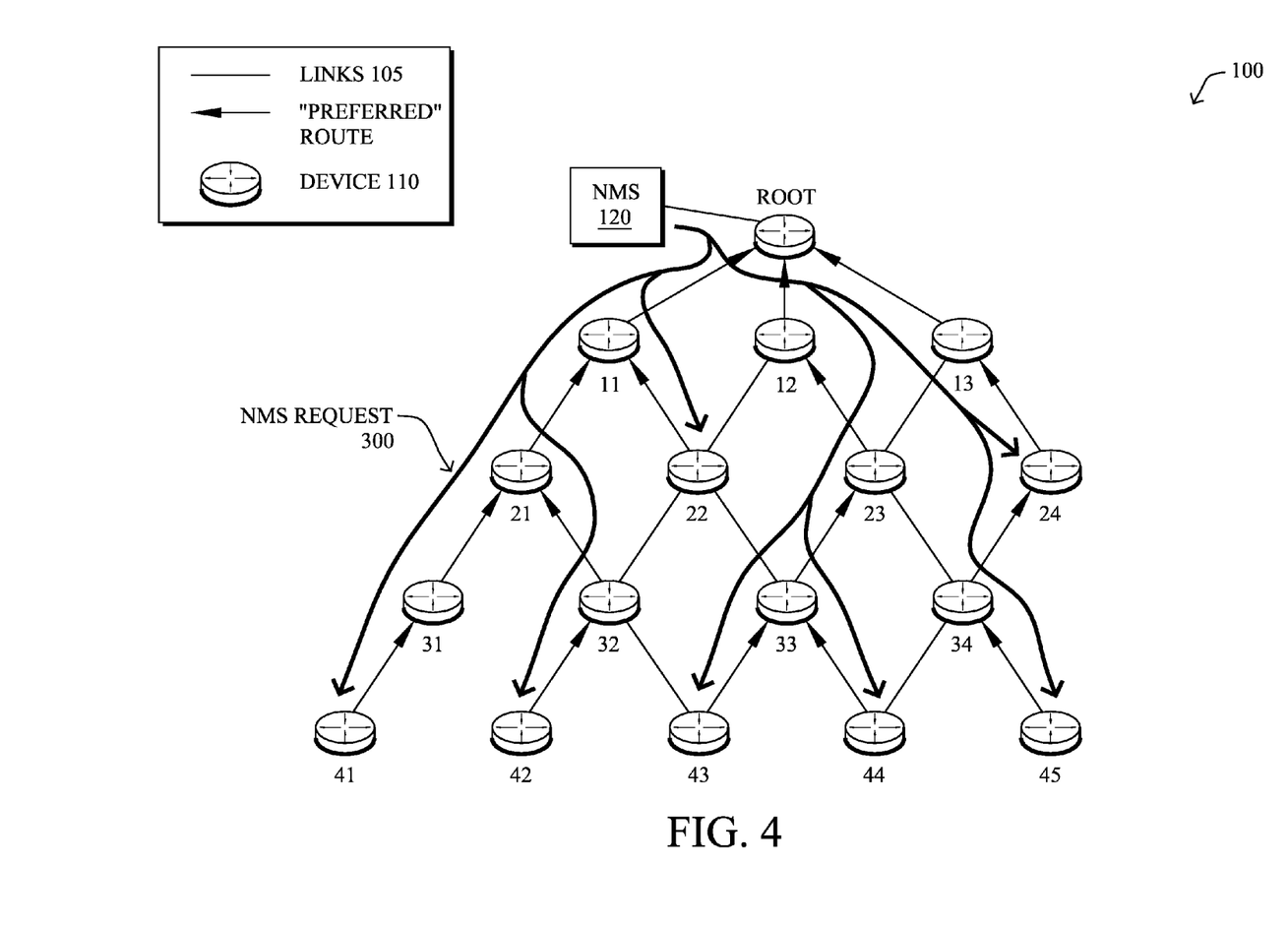
FIG. 4 illustrates an example request phase of a request-response message exchange in the network of FIG. 1.

FIGS. 4-6B illustrate an example NMS request-response exchange in accordance with one or more embodiments described herein, e.g., in order of time. For instance, as shown in FIG. 4, the NMS 120 may generate and transmit the requests 300 from the NMS into the LLN. Illustratively, the request messages 300 are shown as broadcast messages, though could be multicast (to a specific group of devices) or even unicast to each particular desired device, in certain circumstances. As described in detail above, the requests 300 contain a scheduling field 324 that indicates the particular schedule according to which the client nodes respond. As shown in FIG. 5A, for example, according to the schedule defined by the NMS 120 (and optionally specifically determined by the clients 110, e.g., the randomization, distribution, etc.), certain nodes, such as client nodes 11, 22, 24, 42, and 44 may generally respond (responses 500) earlier than the other client nodes in the network (though not necessarily simultaneously together). In FIG. 5B, additional clients 110 may begin to send their scheduled responses 500, such as nodes 12, 31, 34, 41, and 43. Subsequently, based on the schedule, as shown in FIG. 5C, the remaining nodes 13, 21, 23, 32, 33, and 45 may submit their responses, accordingly.

Figure 5A:
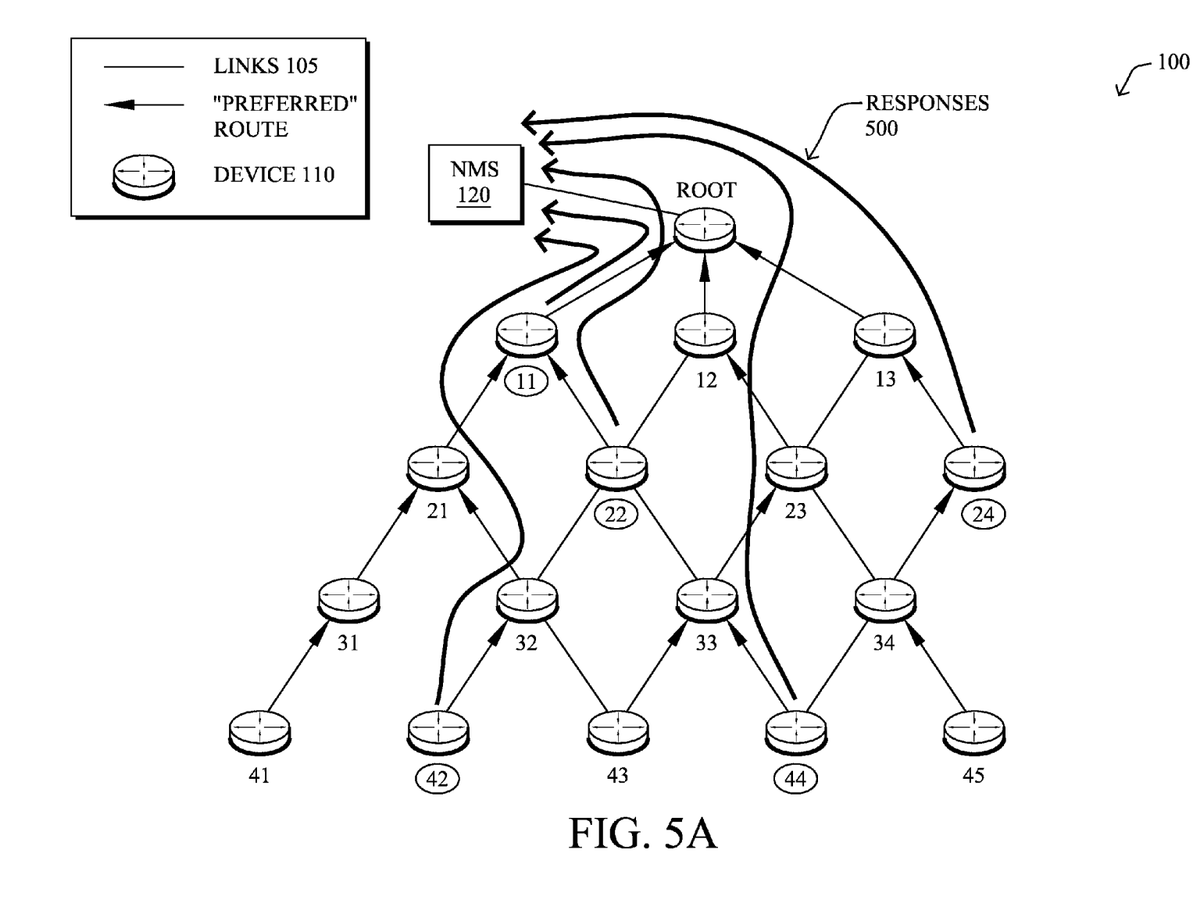
FIGS. 5A-5C illustrate an example of a scheduled response phase of the request-response message exchange initiated in FIG. 4.
Figure 5B:
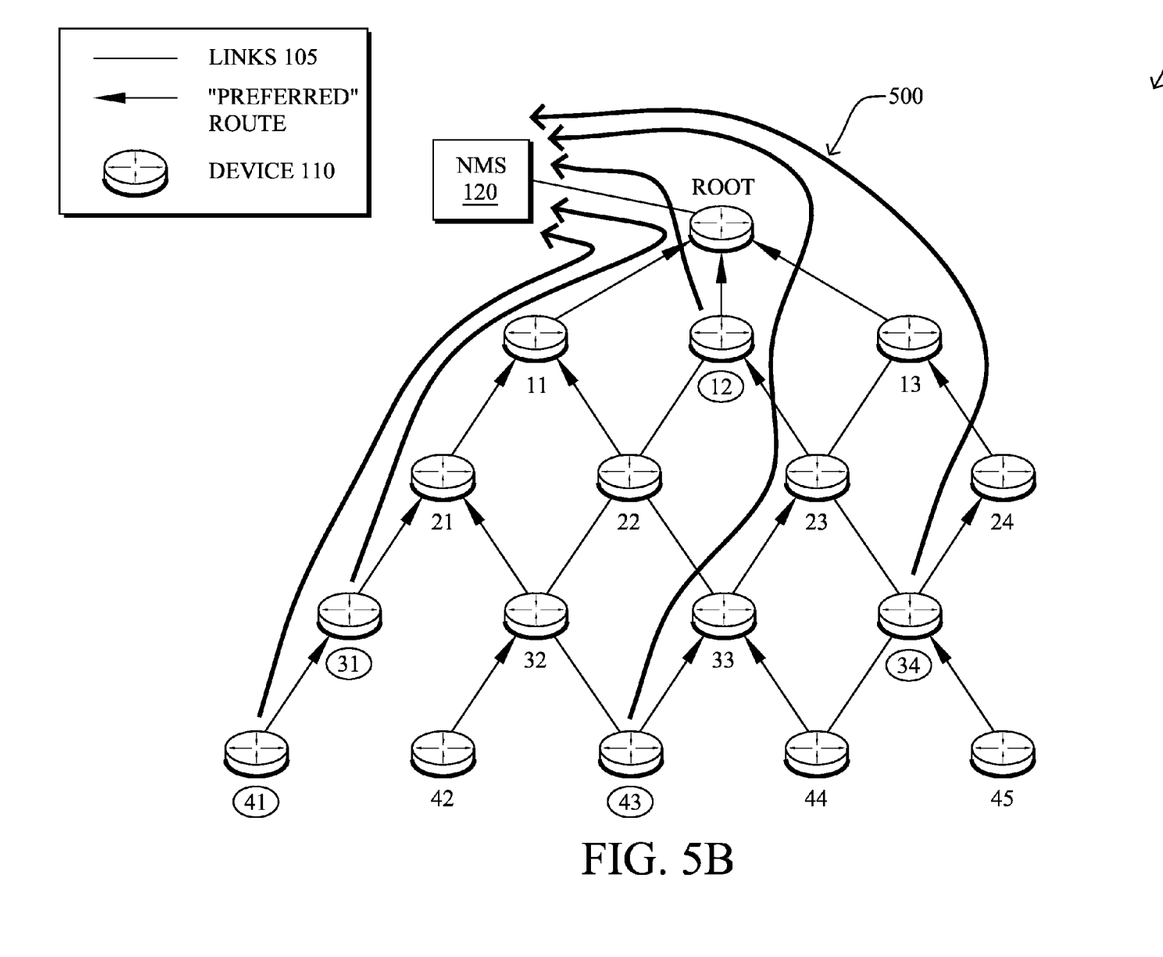
Figure 5C:
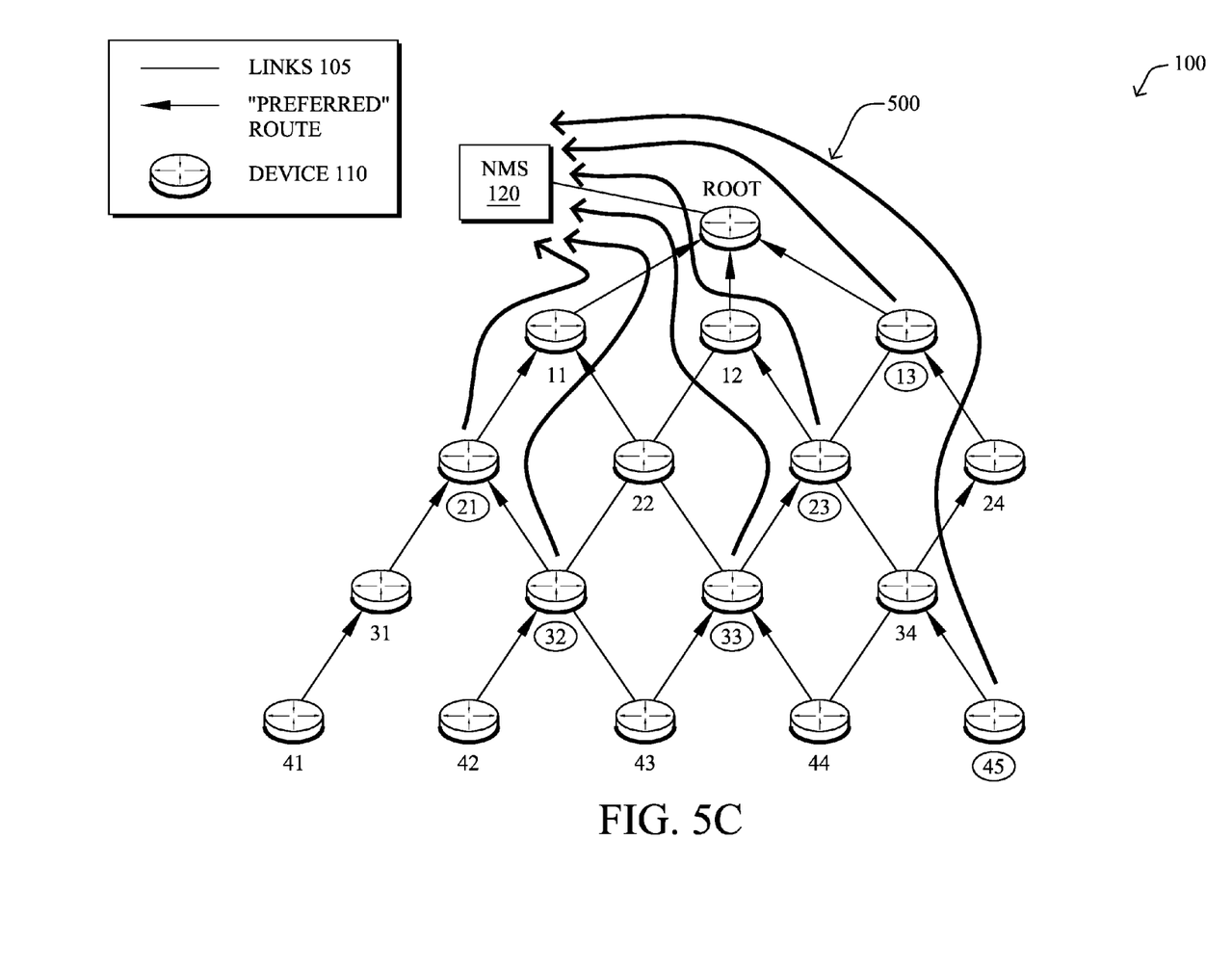

Note that the order of the responses in FIGS. 5A-5C are merely a simple example, and not meant to be interpreted as a limiting embodiment. For example, the schedule from the NMS may be based on DAG depth ("rank"), number of children, network location, geographic location, MAC address, etc., and as a result, the scheduled responses may appear more or less "orderly" (e.g., from completely random to perfectly lock-step), accordingly.

In accordance with one or more embodiments herein, the response message 500 might require an acknowledgment (ACK) by the NMS, leading to a 3-way handshake. In this case, the request packet 300 can also specify the retransmission policy for the response, i.e., response acknowledgement parameters for the NMS to acknowledge the responses from the clients. Such parameters may include, e.g., the number of retries, initial backoff delay, and subsequent backoff delays. For example, the request packet 300 (e.g., schedule field 324) can indicate three retries starting with a 10-second retransmit delay and then using an exponential backoff.

Figure 6A:
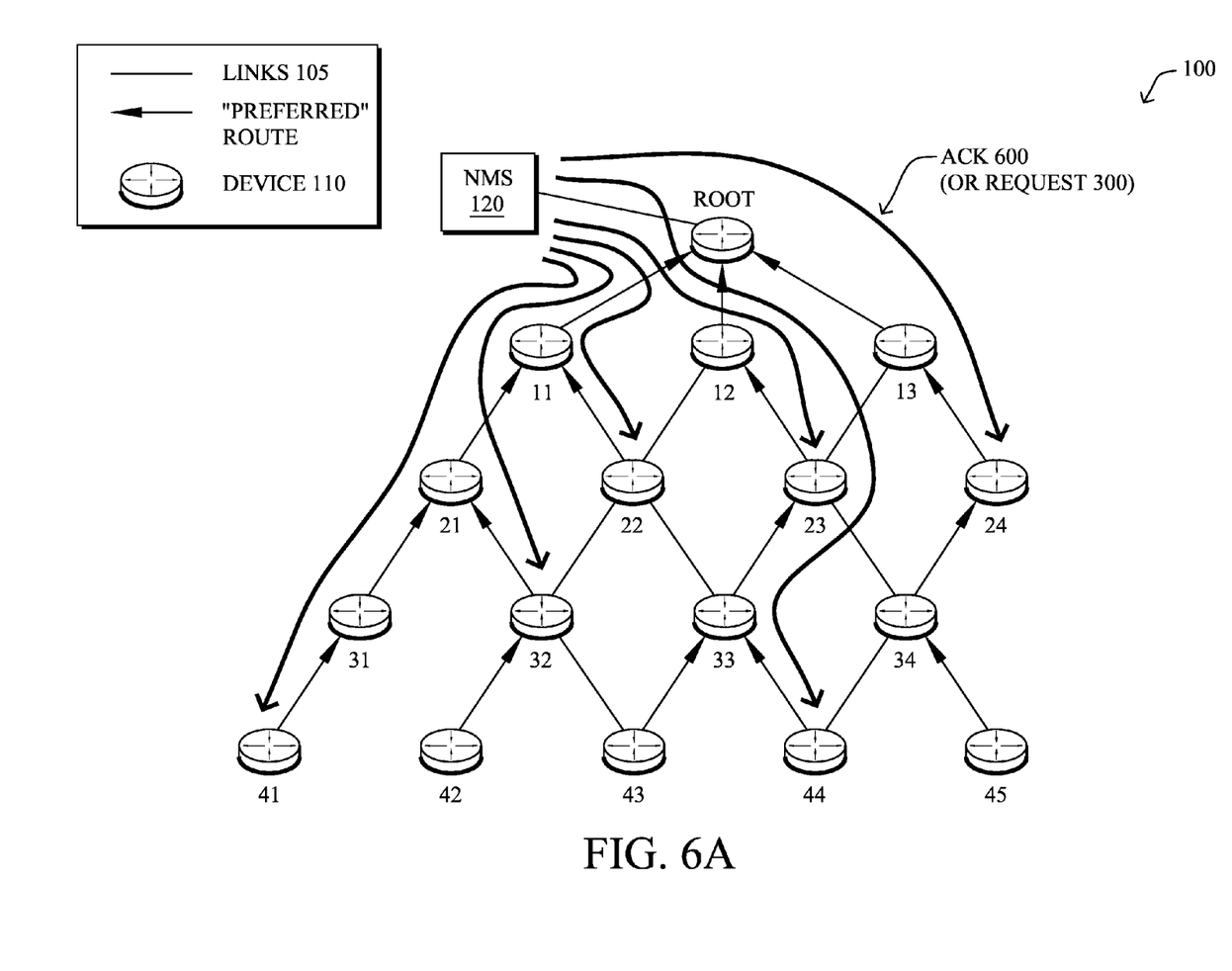
FIGS. 6A-6B illustrates an example of scheduled acknowledgment messages in the request-response message exchange continued through FIGS. 5A-5C (or an alternative view of the request phase of the request-response message exchange as in FIG. 4)
Figure 6B:
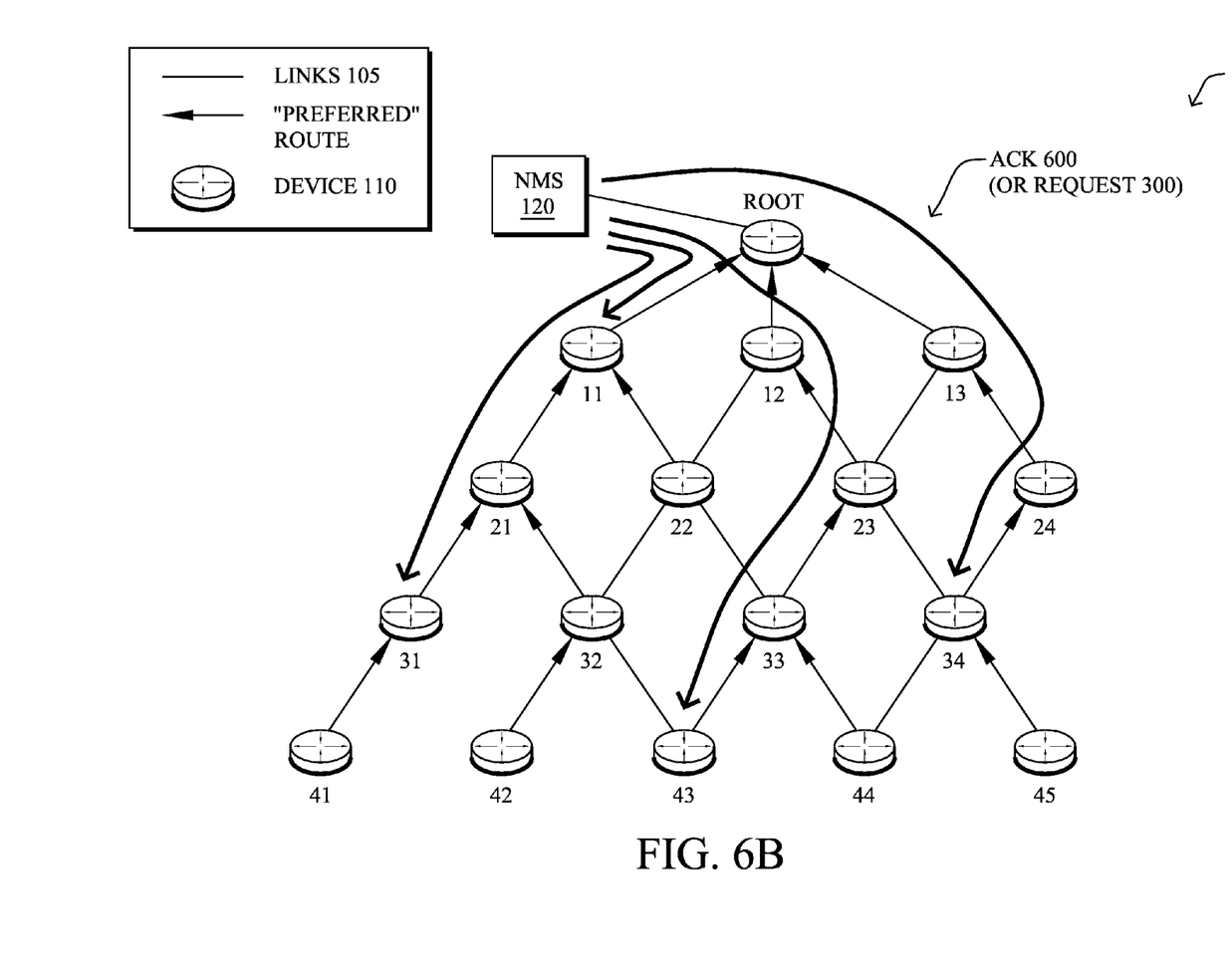

FIGS. 6A-6B, for example, illustrates an example of how the ACK messages 600 may also be scheduled so as to avoid a potential rush of ACKs, as well. Note that the scheduling of the ACKs may be based on attempting to receive a majority of the upward traffic (responses 500) prior to acknowledging the traffic, in order to avoid having large amounts of both upward and downward traffic. Alternatively, ACKs 600 may be simply be randomly dispersed across another time window in a similar manner to both the requests 300 and responses 500 for substantially the same reasons as described above. Illustratively, then, FIG. 6A illustrates a first set of ACKs 600 in time, and then FIG. 6B illustrates a second set of ACKs, accordingly. Note further that not all of the client nodes have received an ACK by the end of FIGS. 6A and 6B, and as such, those client nodes may retransmit their responses 500 accordingly (e.g., immediately or again based on some scheduling as described herein).

Note that in accordance with one or more embodiments described above, an alternative view of FIGS. 6A and 6B may be interpreted as showing selectively scheduled request messages 300 (as opposed to the embodiment shown in FIG. 4 above), such that only certain devices receive the requests as unicast (or multicast) messages, sent at differently scheduled times, accordingly.

Figure 7:
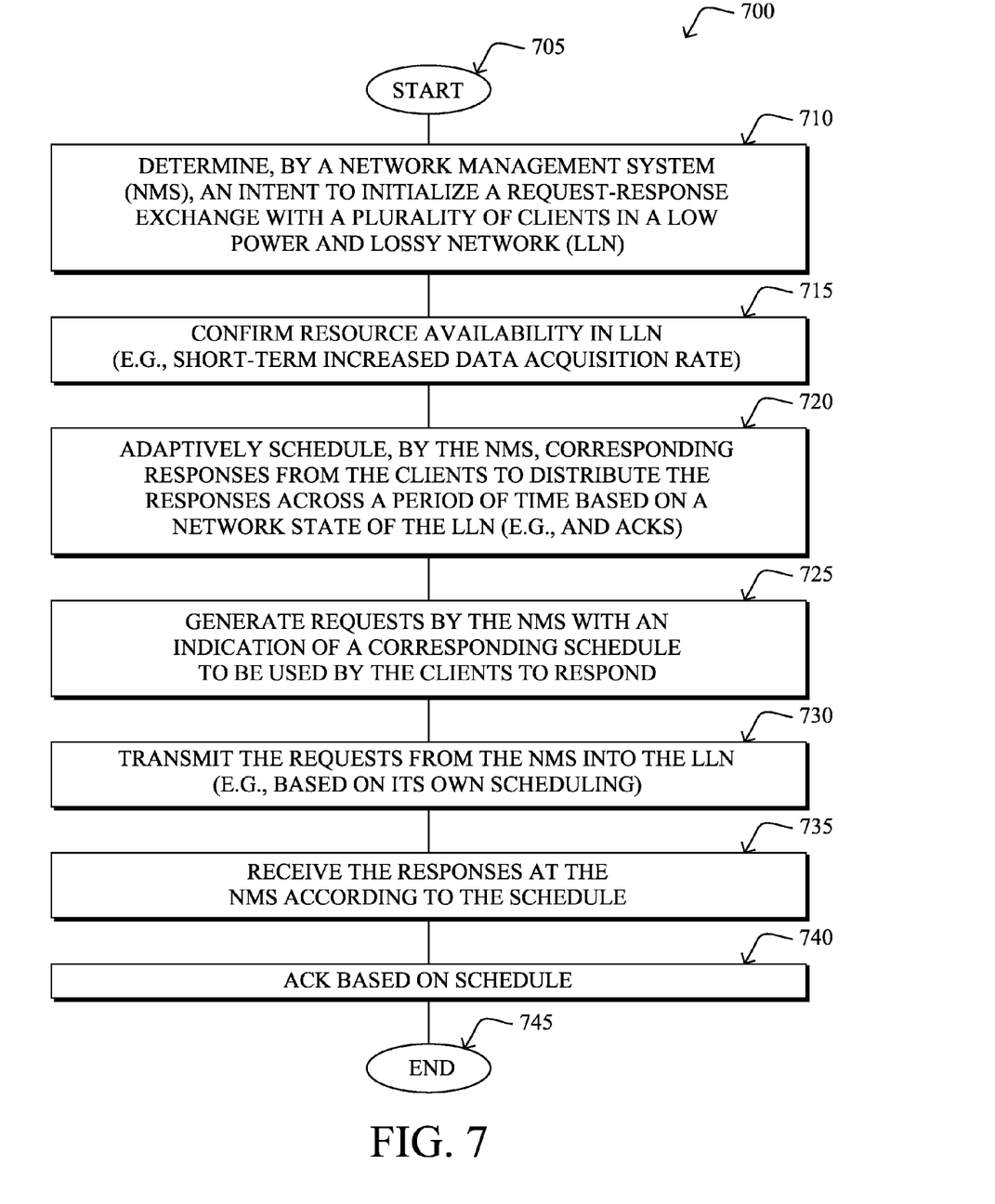
FIG. 7 illustrates an example simplified procedure for network management system (NMS) request-response scheduling, e.g., from the perspective of the NMS.

FIG. 7 illustrates an example simplified procedure for NMS request-response exchange scheduling in accordance with one or more embodiments described herein, e.g., from the perspective of an NMS 120. The procedure 700 starts at step 705, and continues to step 710, where, as described in greater detail above, the NMS 120 determines an intent to initialize a request-response exchange with a plurality of clients 110 in an LLN 100, such as in response to various OAM applications, etc. Optionally, in step 715, the NMS may first confirm its long-term monitored resource availability, e.g., based on a short-term increased data acquisition rate. The NMS may then adaptively schedule corresponding responses 500 from the clients 110 in order to attempt to distribute the responses across a period of time based on the LLN's network state of the LLN. Note, too, that at this time the NMS may also schedule any required ACKs 600.

In step 725, the requests 300 may be generated by the NMS with an indication of a corresponding schedule to be used by the clients to respond (e.g., schedule field 324). The requests may then be transmitted from the NMS into the LLN to the clients 110 in step 730, notably based on an appropriately scheduled time for the requests themselves, and in step 735 the NMS may receive the responses according to the schedule. Note that as mentioned above, the NMS may, in certain 3-way handshaking configurations, return ACKs 600 in step 740 to the clients 110 based on the indicated ACK schedule. The procedure 700 illustratively ends in step 745.

Figure 8:
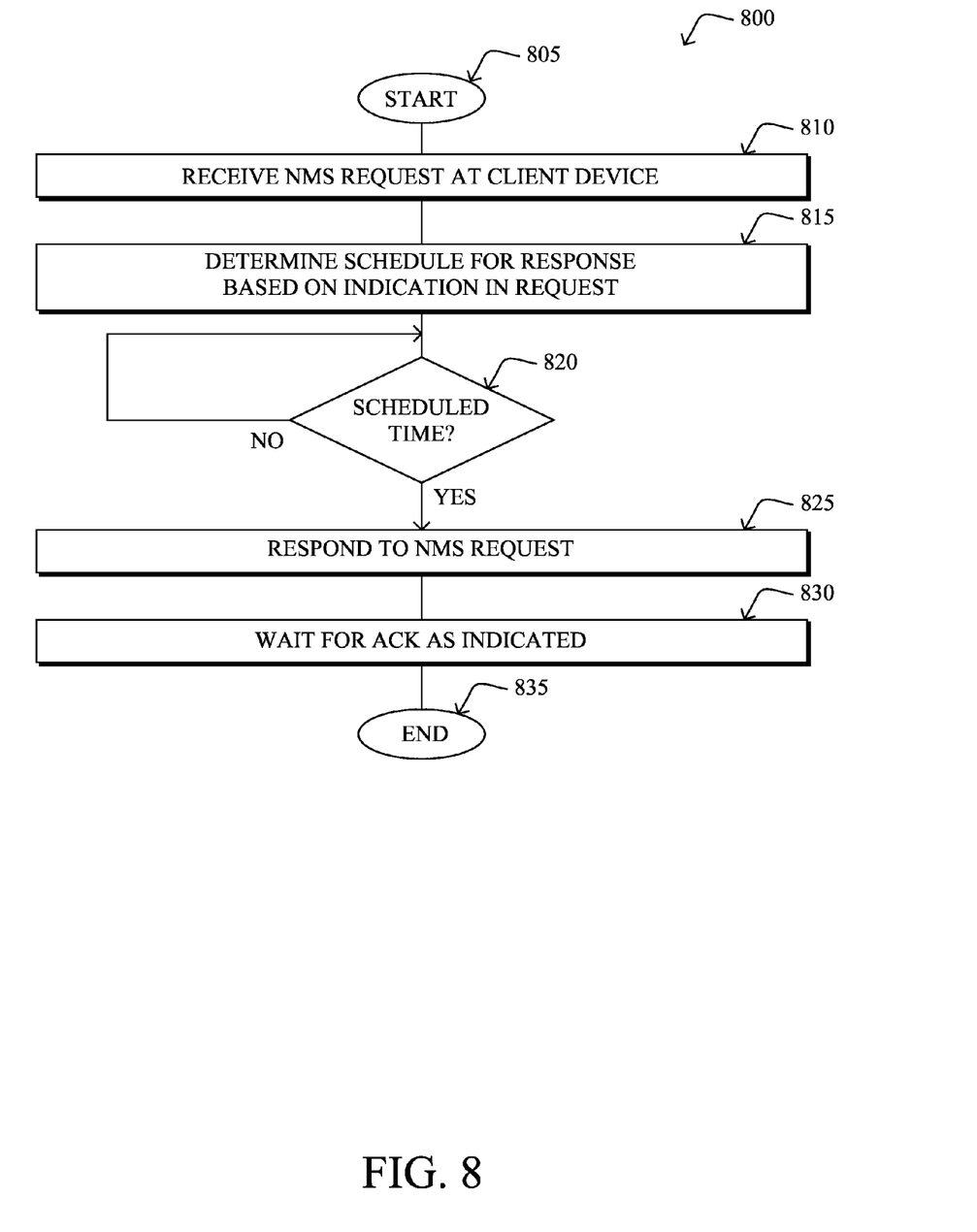
FIG. 8 illustrates another example simplified procedure for NMS request-response scheduling, e.g., from the perspective of a client device.

In addition, FIG. 8 illustrates an example simplified procedure for NMS request-response exchange scheduling in accordance with one or more embodiments described herein, e.g., from the perspective of a client device 110. The procedure 800 starts at step 805, and continues to step 810, where, as described in greater detail above, a client device 110 receives an NMS request 300, and determines its own schedule for response in step 815 based on the indication in the request (schedule field 324). For example, the client device may apply the distribution technique specified by the NMS, or else may determine whether to respond based on filters, etc. Assuming the client is supposed to respond, then once it is the scheduled time in step 820 to do so, the client responds to the NMS request in step 825 (response 500). Note again that where a 3-way handshaking is used, in step 830 the client may wait for an ACK 600 from the NMS as indicated in the initial request 300. The illustrative procedure 800 ends in step 835.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The novel techniques described herein, therefore, provide for adaptively scheduled NMS request-response exchanges in a computer network. In particular, a system in accordance with the techniques herein allows the NMS to utilize highly constrained network resources more effectively while avoiding traffic congestion and complex networking techniques such as QoS and Call Admission Control. In particular, thanks to such an approach, network resources would be optimally used, avoiding traffic congestion and complex networking techniques such as QoS and Call Admission Control, in addition to state maintenance in the network.

Note that as mentioned above, the term "network state" generally refers to the network resource availability (e.g., bandwidth usage, level of congestion on the nodes, etc.). With conventional approaches, the NMS does not perform application scheduling according to the network state and would simply send traffic (including heavy traffic for LLNs such as firmware upgrades) without knowing whether the network can handle it. Furthermore, the polling technique described above obtains network state snapshots on which scheduling may be based, accordingly, which solves a major issue and alleviates cumbersome manual tasks in the field. Lastly, in yet another embodiment, the application scheduling described herein also takes into account the desirable percentage of network resources that are allocated for user data/other applications.

While there have been shown and described illustrative embodiments that provide for adaptively scheduled NMS request-response exchanges in a computer network, it is to be understood that various other adaptations and modifications may be made within the spirit and scope of the embodiments herein. For example, the embodiments have been shown and described herein with relation to LLNs. However, though particularly well-suited for LLNs and constrained networks in general, the embodiments in their broader sense are not as limited, and may, in fact, be used with other types of networks. In addition, while certain protocols are shown, such as RPL, other suitable protocols may be used, accordingly. Also, while a single NMS 120 is shown and described, the techniques herein may also be applied to topologies with a plurality of NMSs 120, and the request-response exchanges between the NMSs may be coordinate to minimize overlaps, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a network management system (NMS), an intent to initialize a request-response exchange with a plurality of clients in a low power and lossy network (LLN);
   adaptively scheduling, by the NMS, corresponding responses from the clients to distribute the responses across a period of time based on a network state of the LLN;
   generating requests by the NMS with an indication of a corresponding schedule to be used by the clients to respond;
   transmitting the requests from the NMS into the LLN; and
   receiving the responses at the NMS according to the schedule.

2. The method as in claim 1, wherein adaptively scheduling corresponding responses is based on one or more specified parameters from an application responsible for the request-response exchange.

3. The method as in claim 1, wherein adaptively scheduling comprises determining a time window within which the clients are to randomly respond, and wherein the indication of the corresponding schedule specifies the determined time window.

4. The method as in claim 1, wherein adaptively scheduling comprises determining a random distribution model to be utilized by the clients, and wherein the indication of the corresponding schedule specifies the determined random distribution model.

5. The method as in claim 4, wherein the determined random distribution model is selected from a group consisting of: a uniform distribution model; and a geometric distribution model.

6. The method as in claim 1, wherein adaptively scheduling comprises determining a set of one or more filters to suppress responses from one or more correspondingly filtered clients, and wherein the indication of the corresponding schedule specifies the determined set of filters.

7. The method as in claim 6, wherein the set of filters is selected from a group consisting of: an address list; a bit-mask to be applied to device addresses; one or more device properties; and one or more link properties.

8. The method as in claim 1, further comprising:
determining response acknowledgement parameters for the NMS to acknowledge the responses from the clients; and
indicating the response acknowledgment parameters within the indication of the corresponding schedule.

9. The method as in claim 1, wherein adaptively scheduling corresponding responses is based on one or more resource utilization bounds within the network.

10. The method as in claim 1, further comprising:
adaptively scheduling, by the NMS, the transmitting of the requests based on the network state of the LLN.

11. The method as in claim 1, wherein adaptively scheduling corresponding responses is based on one or more other request-response exchanges operating in the LLN.

12. The method as in claim 1, further comprising:
determining the network state by based on monitoring resource availability in the LLN, and wherein adaptively scheduling corresponding responses is based on preventing surpassing resource availability in the LLN.

13. The method as in claim 12, further comprising:
maintaining long-term network state based on a first rate of data acquisition;
determining the resource availability based on the long-term network state; and
confirming the resource availability prior to adaptively scheduling corresponding responses based on monitoring the LLN for a short-term at an increased rate of data acquisition.

14. An apparatus, comprising:
one or more network interfaces to communicate with a low power and lossy network (LLN);
a processor coupled to the network interfaces and adapted to execute one or more processes; and
a memory configured to store a network management system (NMS) process executable by the processor, the process when executed operable to:
determine an intent to initialize a request-response exchange with a plurality of clients in the LLN;
adaptively schedule corresponding responses from the clients to distribute the responses across a period of time based on a network state of the LLN;
generate requests with an indication of a corresponding schedule to be used by the clients to respond;
transmit the requests into the LLN; and
receive the responses according to the schedule.

15. The apparatus as in claim 14, wherein the process when executed to adaptively schedule corresponding responses is further operable to base the scheduling on one or more specified parameters from an application responsible for the request-response exchange.

16. The apparatus as in claim 14, wherein the process when executed to adaptively schedule corresponding responses is further operable to determine a time window within which the clients are to randomly respond, and wherein the indication of the corresponding schedule specifies the determined time window.

17. The apparatus as in claim 14, wherein the process when executed to adaptively schedule corresponding responses is further operable to determine a random distribution model to be utilized by the clients, and wherein the indication of the corresponding schedule specifies the determined random distribution model.

18. The apparatus as in claim 14, wherein the process when executed to adaptively schedule corresponding responses is further operable to determine a set of one or more filters to suppress responses from one or more correspondingly filtered clients, and wherein the indication of the corresponding schedule specifies the determined set of filters.

19. The apparatus as in claim 14, wherein the process when executed is further operable to:
determine response acknowledgement parameters for the NMS process to acknowledge the responses from the clients; and
indicate the response acknowledgment parameters within the indication of the corresponding schedule.

20. The apparatus as in claim 14, wherein the process when executed to adaptively schedule corresponding responses is further operable to base the scheduling on one or more resource utilization bounds within the network.

21. The apparatus as in claim 14, wherein the process when executed is further operable to:
adaptively schedule the transmitting of the requests based on the network state of the LLN.

22. The apparatus as in claim 14, wherein the process when executed to adaptively schedule corresponding responses is further operable to base the scheduling on one or more other request-response exchanges operating in the LLN.

23. The apparatus as in claim 14, wherein the process when executed is further operable to:
determine the network state by based on monitoring resource availability in the LLN, and wherein adaptively scheduling corresponding responses is based on preventing surpassing resource availability in the LLN.

24. A tangible, non-transitory, computer-readable media having software encoded thereon, the software when executed by a processor operable to:
determine an intent to initialize a request-response exchange from a network management system (NMS) with a plurality of clients in a low power and lossy network (LLN);
adaptively schedule corresponding responses from the clients to distribute the responses across a period of time based on a network state of the LLN;
generate requests with an indication of a corresponding schedule to be used by the clients to respond;
transmit the requests into the LLN; and
receive the responses according to the schedule.

* * * * *

UNITED STATES PATENT AND TRADEMARK OFFICE
CERTIFICATE OF CORRECTION

| | | |
|---|---|---|
| PATENT NO. | : 8,612,583 B2 | Page 1 of 1 |
| APPLICATION NO. | : 13/194186 | |
| DATED | : December 17, 2013 | |
| INVENTOR(S) | : Jonathan W. Hui et al. | |

It is certified that error appears in the above-identified patent and that said Letters Patent is hereby corrected as shown below:

In the Specification,

Column 1, line 27, please amend as shown:

[[plug-is in]] plug-in electric vehicles, etc. Such applications typically

Column 3, line 6, please amend as shown:

straints on[[ is]] resources such as energy, memory, computa-

Signed and Sealed this
Third Day of June, 2014

Michelle K. Lee
*Deputy Director of the United States Patent and Trademark Office*